United States Patent [19]

Sakai et al.

[11] Patent Number: 5,786,640
[45] Date of Patent: Jul. 28, 1998

[54] GENERATOR CONTROL SYSTEM FOR A HYBRID VEHICLE DRIVEN BY AN ELECTRIC MOTOR AND AN INTERNAL COMBUSTION ENGINE

[75] Inventors: Shoji Sakai; Sadahisa Onimaru; Mitsuo Inagaki; Hironori Asa, all of Nishio, Japan

[73] Assignee: Nippon Soken, Inc., Nishio, Japan

[21] Appl. No.: 596,407

[22] Filed: Feb. 2, 1996

[30] Foreign Application Priority Data

Feb. 13, 1995 [JP] Japan ..................... 7-023820
Nov. 8, 1995 [JP] Japan ..................... 7-290089

[51] Int. Cl.⁶ ..................................... B60L 11/02
[52] U.S. Cl. ............... 290/17; 322/16; 320/64; 180/65.2
[58] Field of Search ............... 290/17, 16, 45, 290/50; 320/61, 64; 180/65.2, 65.3, 65.4, 65.6, 65.8

[56] References Cited

U.S. PATENT DOCUMENTS

| | | | |
|---|---|---|---|
| 4,533,011 | 8/1985 | Heidemeyer et al. | 180/65.2 |
| 4,951,769 | 8/1990 | Kawamura | 180/65.4 |
| 5,176,213 | 1/1993 | Kawai et al. | 180/243 |
| 5,264,764 | 11/1993 | Kuang | 318/139 |
| 5,359,228 | 10/1994 | Yoshida | 290/17 |
| 5,406,126 | 4/1995 | Hadley et al. | 290/45 |
| 5,428,274 | 6/1995 | Furutani et al. | 318/139 |
| 5,469,816 | 11/1995 | Murakawa et al. | 123/2 |
| 5,550,445 | 8/1996 | Nii | 318/153 |

FOREIGN PATENT DOCUMENTS

| | | |
|---|---|---|
| 570 234 | 11/1993 | European Pat. Off. . |
| 5-153703 | 6/1993 | Japan . |
| 5-328525 | 12/1993 | Japan . |
| 6-197406 | 7/1994 | Japan . |

*Primary Examiner*—Steven L. Stephan
*Assistant Examiner*—Nicholas Ponomarenko
*Attorney, Agent, or Firm*—Cushman Darby & Cushman IP Group of Pillsbury Madison & Sutro LLP

[57] ABSTRACT

A series hybrid vehicle comprises a generator 30 driven by an internal combustion engine 40, a battery 20 chargeable by generator 30, an electric motor 10 rotated by electric power of generator 30 and battery 20. A parallel hybrid vehicle comprises, a battery 200 chargeable by an electric motor 100, and selectively uses an internal combustion engine 400 and electric motor 100 as driving source for driving vehicle wheels 900. In these -hybrid vehicles, there is provided a sensor 21 or 201 for detecting the state of charge (SOC) of battery 20 or 200. An output of generator 30 or internal combustion engine 400 is controlled based on each the SOC and a variation the SOC.

45 Claims, 9 Drawing Sheets

GENERATOR CONTROL SYSTEM FOR A HYBRID VEHICLE DRIVEN BY AN ELECTRIC MOTOR AND AN INTERNAL COMBUSTION ENGINE

BACKGROUND OF THE INVENTION

1. Field of the Invention

This invention relates to a hybrid vehicle driven by two driving sources, such as a combination of an electric motor supplied with electric power from a battery and an internal combustion engine using fuel such as gasoline or light oil. More particularly, the invention relates to a generator control system for hybrid vehicles capable of providing an extended cruising distance without losing the benefits of an electric car, suppressing harmful emission during the rapid acceleration, and optimizing energy loss during the charging operation of the battery.

2. Related Art

Electric cars driven by motors are advantageous, when compared with the normal vehicles driven by engines, in that electric cars are so clean in exhaust gas emission as to cause no air pollution. Also, and in that noises are extremely small and the drivability, such as response in acceleration and deceleration, is excellent. On the other hand, because of the nature of the electric cars, the cruising distance is short due to the poor capacity of the batteries presently available present days, and the energy cost per unit travelling distance travelled is still expensive.

To eliminate the weakness of electric cars and enhance their advantages, there have been proposed various hybrid vehicles driven chiefly by a combination of an electric motor which is supplied electric power from batteries and an internal combustion engine using fuel such as gasoline or light oil.

The hybrid vehicles are roughly divided into two types. One of them is a series hybrid vehicle (SHV) which uses the electric motor as a single driving source for driving the wheels of the vehicle and uses the internal combustion engine as a source for rotating a generator for charging the battery. The other is a parallel hybrid vehicle (PHV) which selectively or alternately uses the motor and the internal combustion engine as a driving source for driving the wheels of the vehicle in accordance with travelling conditions of the vehicle.

According to the series hybrid vehicle, the internal combustion engine is controlled in such a manner that the generator directly connected to the engine generates enough electric power to charge the battery up to a predetermined SOC (State of Charge) level, while reducing the amount of exhaust gas as much as possible. In this case, the internal combustion engine is usually driven at a constant speed in order to reduce the amount of exhaust gas emitted from the engine.

FIG. 5 shows one example showing the average power required when the series hybrid vehicle is travelling.

FIGS. 6A and 6B are graphs showing the change of SOC and the generated output in accordance with a conventional generator control system for the hybrid vehicle.

In general, the charging operation of batteries is inherently subjected to significant energy loss due to generation of heat. To eliminate such energy loss, there is proposed a method for driving the series hybrid vehicle accompanied with a representative power consumption shown in FIG. 5. According to this method, the SOC control range (the SOC zone defined by upper and lower limits) is narrowed as shown in FIG. 6A. This control method is advantageous in that the energy loss can be minimized because a charging amount in each charging operation is small.

In this case, the hybrid vehicle is chiefly driven by the generator. Electric power of the battery is occasionally used to supplement or compensate for the shortage of electric power generated from the generator.

A problem of such a control method is that the generator needs to be so frequently activated or deactivated that the generated power is repetitively fluctuated between the predetermined set value and the idle value. In other words, the operating condition of the internal combustion engine is so rapidly and frequently varied that the exhaust gas emission is fairly deteriorated.

Meanwhile, as shown in FIG. 6B, it is possible to drive the hybrid vehicle with an enlarged SOC control range. This method is advantageous in that the fluctuation of the engine operating condition can be suppressed. However, as described above, the energy loss increases with increasing charging amount in each charging operation of the battery.

On the other hand, among parallel hybrid vehicles, there is known a parallel hybrid vehicle equipped with a motor/generator having functions of both a motor and a generator so as to occasionally charge the battery.

In the charging operation of batteries used for the above-described hybrid vehicles, the generator is usually rotated by the internal combustion engine in such a manner that the residual capacity of the battery is maintained in an allowable or preferable range defined by predetermined upper and lower limits. Thus, preventing the batteries are prevented from being excessively charged or discharged for an extended battery life, and a motor driving control is realized using the batteries being adequately charged.

For the series hybrid vehicles the, charging of batteries is immediately started upon each start-up of the associated internal combustion engine. In this case, the internal combustion engine is driven at the optimum fuel economy rate point (refer to FIG. 9) so as to cause the generator to produce a constant electric power. On the other hand, for the parallel hybrid vehicles, the internal combustion engine is driven within a predetermined region having the optimum fuel economy rate (refer to FIG. 9) based on the engine speed determined by the vehicle speed. The charging of batteries is performed by utilizing the surplus of the electric power generated by the generator.

According to Unexamined Japanese patent application No. HEI 6-197406, published in 1994, an average consumption of electric power of a hybrid vehicle is obtained to set a generation start point at a relatively higher value when the obtained average consumption electric power is relatively large, so that the charging operation of the battery can be started at an earlier time. Thus, the SOC is prevented from being excessively lowered even when the battery is subjected to a large load.

However, when the hybrid vehicle is abruptly accelerated, there is the possibility that the hybrid vehicle may be suffering from a shortage of electric power because the output of the engine-driven generator remains the same due to the engine rotational speed being maintained at a constant value irrespective of such an acceleration. In this case, it is generally necessary to use the electric energy stored in the battery. If such an acceleration is continued for a long time, it is feared that the energy stored in the battery will be so excessively consumed that the motor is no longer supplied with sufficient electric current, leading to the deterioration of the driving performance of the hybrid vehicle.

According to Unexamined Japanese patent application No. HEI 5-328525, published in 1993, a plurality of parameters are sensed to judge the vehicle driving conditions so as to drive the engine within a specific operating region where the fuel consumption of the engine is small. Namely, to control the electric power produced by the generator, the rotational speed of the internal combustion engine is varied in accordance with the driving conditions of the series hybrid vehicle.

However, controlling the output of the engine-driven generator solely in accordance with the vehicle driving conditions is not desirable because the fuel consumption in the engine is increased, or exhaust gas emission is worsened due to large variation or fluctuation of the engine speed.

On the other hand, if the maximum power output of the engine-driven generator is limited to suppress fuel consumption in the engine or prevent the exhaust gas emission from worsening, the engine-driven generator may encounter a shortage of the power output. Such a shortage of electric power can be compensated by the energy stored in the battery. However, simply relying on the stored energy in the battery may result in the fatal lack of residual capacity of the battery and substantially reduces the cruising distance of the hybrid vehicle.

When the battery is frequently subjected to excessive loads, the life of the battery will be fairly shortened.

Furthermore, the reduction of the cruising distance may be induced from the energy loss caused in the charging operation of the battery. For example, when the surplus of electric power produced by the generator is stored during a constant-speed cruising condition.

Moreover, according to the engine operating method of the above-described parallel hybrid vehicle, there is a problem that the driving feeling is worsened at the switching (each start and each end) timing in the battery charging operation.

Still further, charging the battery is inherently subjected to a generation of heat, thereby causing energy loss. This kind of energy loss increases with increasing charging power.

In the above-described engine operating method (the method of driving the internal combustion engine in the optimum fuel economy rate region in accordance with the engine speed as determined by the vehicle speed), the engine is always driven in the optimum fuel economy rate region regardless of change of battery conditions. Hence, the obtained charging power will be fairly large compared with the required power. This will increase the amount of the above-described energy loss.

SUMMARY OF THE INVENTION

Accordingly, in view of above-described problems encountered in the related art, a principal object of the present invention is to provide a generator control system for series/parallel hybrid vehicles capable of maintaining the battery residual capacity within an allowable or desirable range, and optimizing the energy loss during the battery charging operation, without worsening exhaust gas emission during acceleration.

In order to accomplish this and other related objects, a first aspect of the present invention provides a generator control system for hybrid vehicles including a generator driven by an internal combustion engine. A battery is chargeable by the generator, and an electric motor is driven by electric power supplied from the generator and the battery; state-of-charge detecting means detects a state of charge of the battery. A generated output control means for controls an electrical output of the generator based on not only the state of charge of the battery but also a variation of the state of charge.

According to the above-described control system, the state of charge of the battery can be always maintained within a preferable range without causing excessive charge and excessive discharge, thereby preventing the performance of the battery from deteriorating. Furthermore, it becomes possible to optimize the energy loss during the charging operation of the battery, thereby enabling the hybrid vehicle to cruise an extended distance. Moreover, the capability of suppressing the variation or fluctuation of generated output makes it possible to stabilize the operation of the internal combustion engine, thereby preventing exhaust gas emission from worsening.

In the above-described generator control system for hybrid vehicles, it is preferable that the generated output control means performs a fuzzy control in such a manner the electrical output is maintained when a residual capacity of the battery is large and the battery is discharging, decreased when the residual capacity of the battery is large and the battery is charging, increased when the residual capacity of the battery is small and the battery is discharging, and maintained when the residual capacity of the battery is small and the battery is charging.

According to features in the preferred embodiment, the electric motor has a function of generating electric power to charge the battery by utilizing a regenerative braking in a deceleration of a hybrid vehicle. The control means comprises a memory for storing control commands used for the computation of a target power output of the generator. The memory stores the control commands in relation to the state of charge and the variation of the state of charge, preferably in the form of a three-dimensional data map. Alternatively, for obtaining the control command used for the computation of the target power output of the generator, the control means can use an equation defined by the state of charge and the variation of the state of charge.

According to further features in the preferred embodiment, there is provided a hybrid vehicle including an internal combustion engine. A generator is connected to and driven by the internal combustion engine. An inverter electrically connected to the generator and, a battery is chargeable by the generator through the inverter. An electric motor is driven by electric power supplied from the generator and the battery through the inverter, the electric motor acting as a driving source for driving vehicle wheels. A state-of-charge detecting means detects a state of charge of the battery. A control means controls an electrical output of the generator based on not only the state of charge of the battery but also a variation of the state of charge.

The internal combustion engine is exclusively used for rotating the generator. The electric motor has an output shaft connected to the vehicle wheels through a driving mechanism including a transmission and a differential mechanism. The internal combustion engine is driven at a wide open throttle condition, so that an output of the internal combustion engine is controlled by an amount of fuel supplied by a fuel supply device while maintaining a throttle at a wholly opened position. The internal combustion engine is controlled within a limited output range so that an output of the internal combustion engine has a one-to-one relationship with a rotational speed of the internal combustion engine. The inverter charges the battery by utilizing residual electric power when the generator generates excessive electric power.

Furthermore, a second aspect of the present invention provides a generator control system for hybrid vehicles including an electric motor having both motor and generator functions so as to form one driving source for driving wheels of a hybrid vehicle and also serve as a generating source for generating electric power. An internal combustion engine forms another driving source for driving the wheels of the hybrid vehicle. A clutch is interposed between the electric motor and the internal combustion engine for selectively engaging and disengaging the internal combustion engine with and from the electric motor. A battery is chargeable by the electric motor, and a state-of-charge detecting means detects a state of charge of the battery. A engine output control means for controls an output of the internal combustion engine and -a residual capacity of the battery based on not only the state of charge of the battery but also a variation of the state of charge. A motor function switching means switches the electric motor between the motor function and the generator function on the basis of the control by the engine output control means. A clutch controlling means engages and disengages the internal combustion engine with and from the electric motor on the basis of the control by the engine output control means.

According to the above-described second aspect of the control system, the state of charge of the battery can be always maintained within a preferable range without causing excessive charge and excessive discharge, thereby preventing the performance of the battery from deteriorating. Furthermore, it becomes possible to optimize the energy loss during the charging operation of the battery, thereby enabling the hybrid vehicle to cruise for an extended distance. Moreover, the capability of suppressing the variation or fluctuation of generated output makes it possible to stabilize the operation of the internal combustion engine, thereby preventing exhaust gas emission from worsening.

In the above-described second aspect of the generator control system for hybrid vehicles, it is desirable that the engine output control means performs a fuzzy control in such a manner that an engine operating region is maintained when a residual capacity of the battery is large and the battery is discharging, shifted to a lower output region when the residual capacity of the battery is large and the battery is charging, shifted to a larger output region when the residual capacity of the battery is small and the battery is discharging, and maintained when the residual capacity of the battery is small and the battery is charging.

According to features in the preferred embodiment, the engine output controls means control the output of the internal combustion engine so as to maintain the state of charge of the battery at a predetermined constant level. The electric motor generates electric power to charge the battery by utilizing a regenerative braking in a deceleration of the hybrid vehicle. The engine output control means is associated with a memory for storing control commands used for the computation of a target output of the internal combustion engine. The memory stores the control commands in relation to the state of charge and the variation of the state of charge, preferably in the form of a three-dimensional data map. Alternatively, for obtaining the control command used for computation of the target output of the internal combustion engine, the control means uses an equation defined by the state of charge and the variation of the state of charge.

According to further features of the preferred embodiment, there is provided a hybrid vehicle including an electric motor having both motor and generator functions so as to form one driving source for driving vehicle wheels and also serve as a generating source for generating electric power. An internal combustion engine forms another driving source for driving the wheels of the hybrid vehicle. A clutch interposed between the electric motor and the internal combustion engine selectively engages and disengages the internal combustion engine with and from an input shaft of the electric motor. An inverter is electrically connected to the electric motor and a battery is chargeable by the electric motor through the inverter. Vehicle wheels are connected to an output shaft of the electric motor through a driving mechanism. A state-of-charge detecting means detects a state of charge of the battery. An engine output control means controls an output of the internal combustion engine and a residual capacity of the battery based on not only the state of charge of the battery but also a variation of the state of charge. A motor function switching means switches the electric motor between the motor function and the generator function on the basis of the control by the engine output control means. A clutch controlling means for engages and disengages the internal combustion engine with and from the electric motor on the basis of the control by the engine output control means.

Moreover, another aspect of the present invention provides several methods for controlling the above-described hybrid vehicle systems.

BRIEF DESCRIPTION OF THE DRAWINGS

The above and other objects, features and advantages of the present invention will become more apparent from the following detailed description which is to be read in conjunction with the accompanying drawings, in which:

FIG. 4A is a graph showing the change of SOC (State of Charge) during the cruising of the hybrid vehicle while

DETAILED DESCRIPTION OF THE PREFERRED EMBODIMENTS

Preferred embodiments of the present invention will be explained in greater detail hereinafter, with reference to the accompanying drawings.

Figure 1:
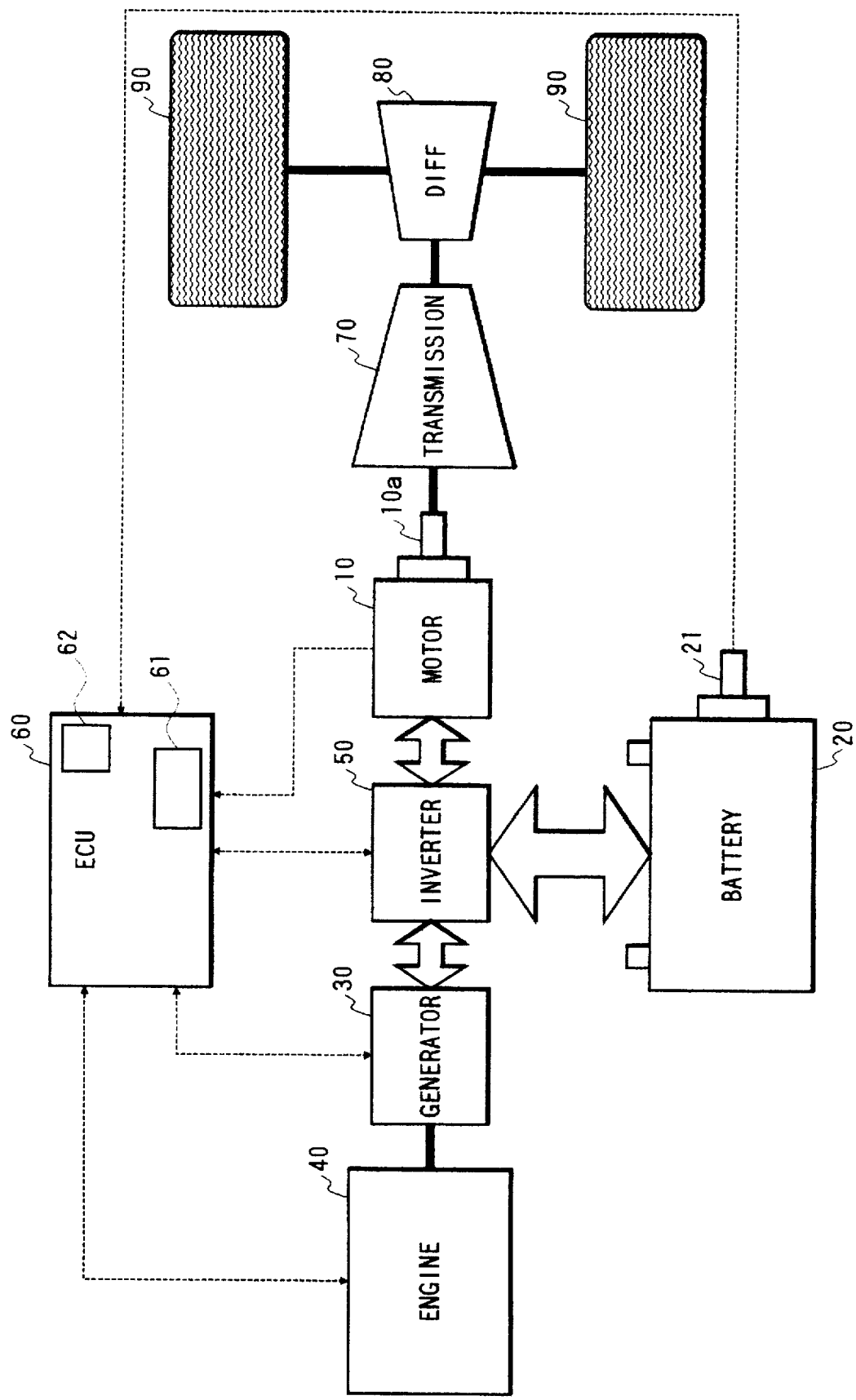
FIG. 1 is a block diagram showing an overall arrangement of a generator control system incorporated in a series hybrid vehicle in accordance with a first embodiment of the present invention.

FIG. 1 is a view showing an overall arrangement of a generator control system incorporated in a series hybrid vehicle in accordance with a first embodiment of the present invention, wherein the generator is directly connected to and driven by an internal combustion engine. A hybrid vehicle generally comprises, as a driving source of the vehicle, an electric motor 10 whose capacity or total number is determined in accordance with the specifications of each vehicle. For the purpose of simplifying the explanation, only one electric motor 10 is shown in the drawing.

The electric motor 10, which is either a DC motor or an AC motor, has an output shaft 10a connected linked in a driving relationship to vehicle wheels 90 through a conventional driving mechanism including a transmission 70 and a differential mechanism 80.

The electric motor 10 is electrically connected to a battery 20 via an inverter 50. The inverter 50 is operated by an electronic control unit (ECU) 60. The battery 20 supplies the electric motor 10 with electric power through this inverter 50, so that the hybrid vehicle is driven by the electric motor 10.

Furthermore, electric motor 10 has a function of generating electric power, too. Utilizing regenerative braking during deceleration of vehicle, electric motor 10 generates regenerative electric power and utilizes the regenerated power to charge up battery 20. The battery 20 is equipped with a battery capacity sensor 21 detecting an integrating current value, which is a parameter representing the state of charge (SOC) of battery 20.

The vehicle comprises an internal combustion engine 40 which is directly connected in a driving relation to a generator 30. In view of driving efficiency of internal combustion engine 40, the internal combustion engine 40 will be driven at a WOT (wide open throttle) condition, wherein the output of internal combustion engine 40 is controlled by the amount of fuel injected by an fuel injection valve while the throttle (not shown) is maintained at a wholly opened position.

To realize the high efficient drive, the internal combustion engine 40 of the first embodiment has a limited output range wherein the output of internal combustion engine 40 has a one-to-one relationship with a rotational speed thereof.

The generator 30, which is preferably a high efficient generator, is driven by internal combustion engine 40 and generates electric power which is variable in response to the rotational speed of internal combustion engine 40.

The electric motor 10 can be driven by electric power generated by generator 30 or by electric power stored in battery 20. When generator 30 generates electrical power excessively, residual electric power is used to charge battery 20 through inverted 50.

Inverter 50, is interposed among electric motor 10, battery 20 and generator 30 so as to be electrically connectable with each of them, and is controlled by ECU 60 so as to establish or release an electrical connection between each two elements of electric motor 10, battery 20 and generator 30, and also to adjust an electric value in the power supply from one element to a corresponding element.

ECU 60, inputting detection data from sensors and controlling various components of the hybrid vehicle, comprises a memory 62 storing later-described control programs and various data used for computations, and interface circuits sending out control signals to the components of the hybrid vehicle or receiving signals from the same or sensors.

In this first embodiment, ECU 60 comprises a generator output controller 61 which receives detection signals from battery capacitor sensor 21 and performs a fuzzy control of an output of generator 30 in accordance with the state of charge (SOC) itself of battery 20 and the variation of SOC.

Figure 2:
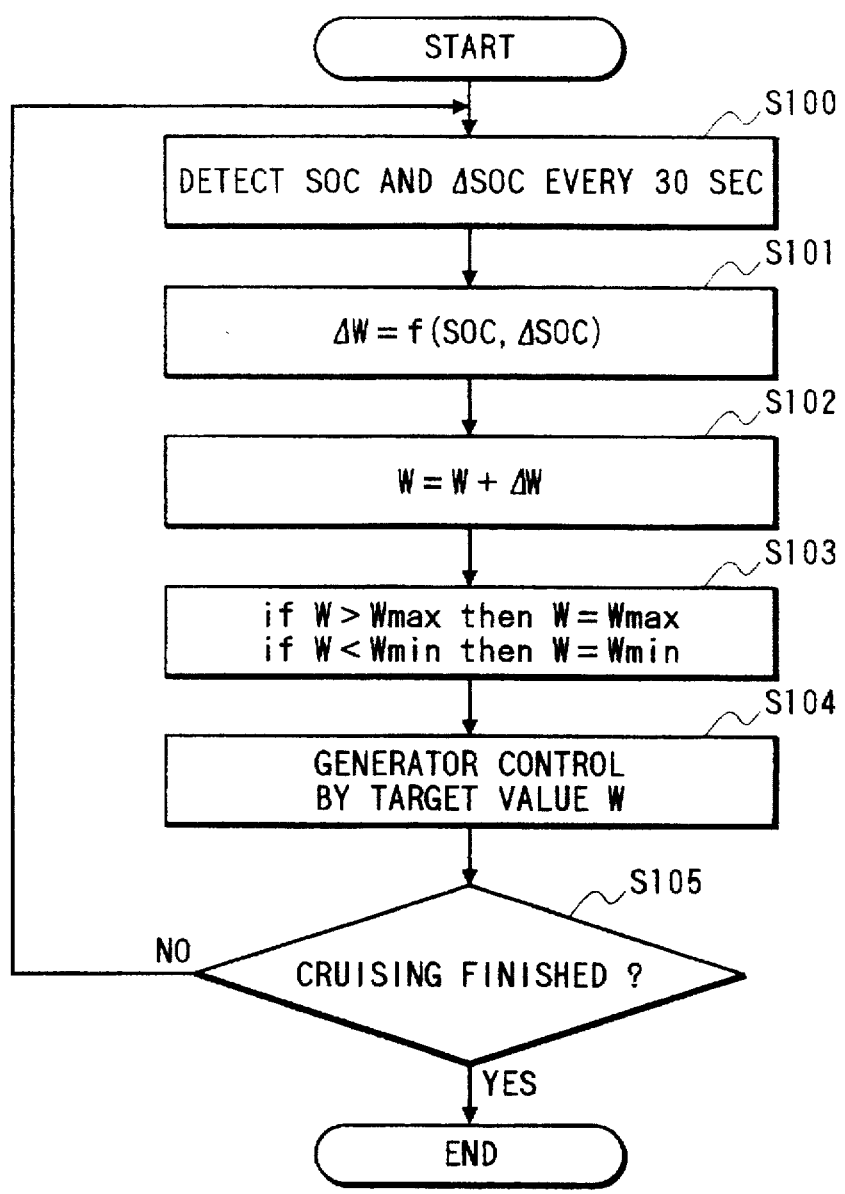
FIG. 2 is a flow chart illustrating the operation of a generator output controller of an ECU shown in FIG. 1.
Figure 3:
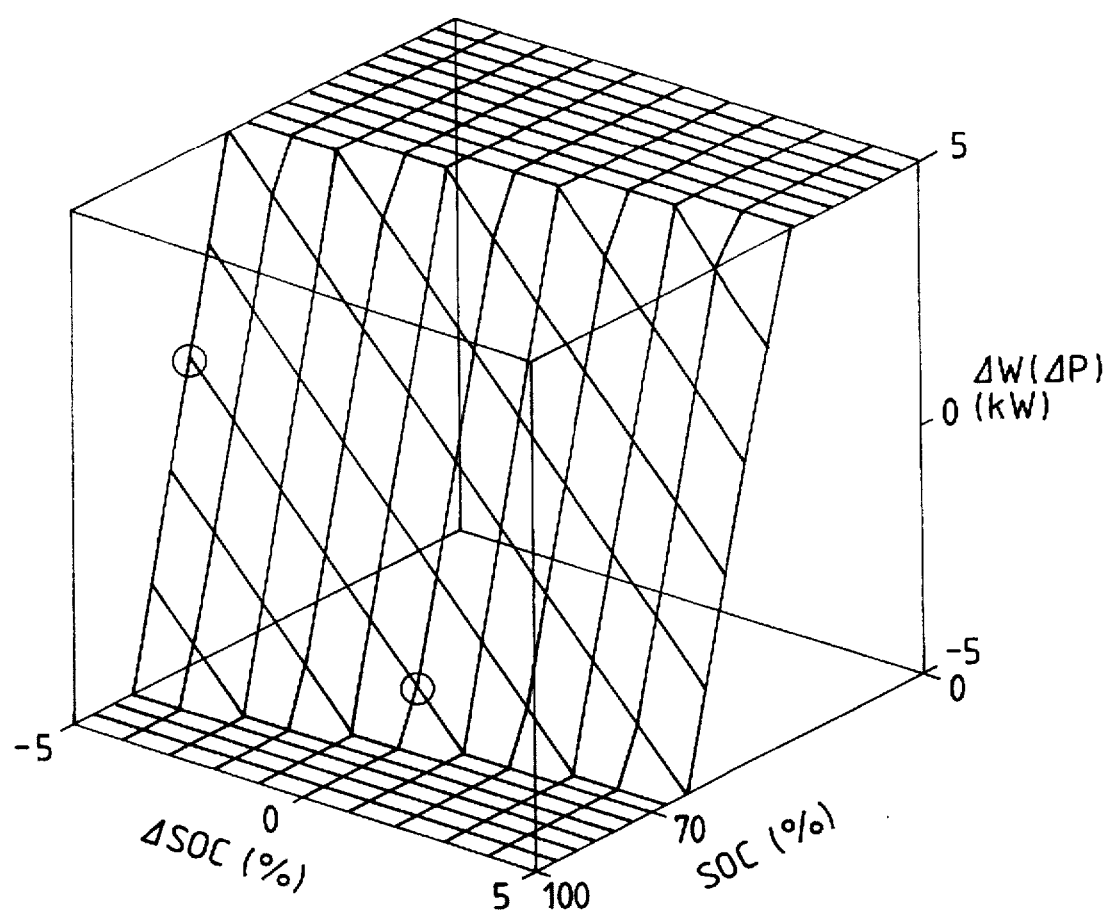
FIG. 3 is one example showing a three-dimensional data map used for calculating a command variation amount in the calculation of the target generator power output in the first embodiment, or an engine output correction amount in the calculation of the target engine output in a second embodiment.

FIG. 2 is a flow chart illustrating the operation of generator output controller 61 of ECU 60. FIG. 3 is one example showing a three-dimensional data map used for obtaining a command variation amount $\Delta W$ in the calculation of target power output "W".

In step S100, after the routine is started upon a start-up operation of the hybrid vehicle, generator output controller 61 detects the state of charge (SOC) of battery 20 together with its variation $\Delta SOC$ every 30 seconds based on the signals sent from battery capacity sensor 21.

In step S101, generator output controller 61 calculates the command variation amount $\Delta W$ using SOC and $\Delta SOC$ as parameters of the following function:

$$\Delta W = f(SOC, \Delta SOC) \qquad (1).$$

As shown in FIG. 3, command variation amount $\Delta W$ is expressed in the form of a three-dimensional data map in relation to SOC and $\Delta SOC$. The data of this map are determined in accordance with the required performance of the vehicle in the design of the control system.

More specifically, the. map shown in FIG. 3 illustrates the rule for the fuzzy control, according to which (1) the target power output "W" is maintained when SOC is high and $\Delta SOC$ is a negative value;

(2) the target power output "W" is decreased when SOC is high and $\Delta SOC$ is a positive value;

(3) the target power output "W" is increased when SOC is low and $\Delta SOC$ is a negative value; and (4) the target power output "W" is maintained when SOC is low and $\Delta SOC$ is a positive value.

In this first embodiment, the target value for SOC control is set to 60%, taking account of the experimental result that the charging efficiency of the battery was worsened when SOC is 70% or more.

With reference to FIG. 3, it will be understood that command variation amount $\Delta W$ takes +1 (kw) when SOC is 70% and $\Delta SOC$ is $-5\%$, and takes $-4$ (kw) for the same SOC when $\Delta SOC$ is changed to 0%, as indicated by small circles in the drawing.

In this case, command variation amount $\Delta W$ can be given by the following equation:

$$\Delta W = -0.4 \times SOC - \Delta SOC + 24.0, \text{ when } -5.0 \leq \Delta W \leq 5.0; \Delta W = 5.0,$$
$$\text{when } \Delta W > 5.0; \text{ and } \Delta W = -5.0, \text{ when } \Delta W < -5.0 \qquad (1').$$

Returning to the flow chart of FIG. 2, in step S102, generator output controller 61 calculates the target power output "W" using the following formula:

$$W = W + \Delta W \qquad (2).$$

In the next step S103, generator output controller 61 makes a judgement as to whether the newly obtained target power output "W" thus calculated in step S102 exceeds a predetermined maximum power output "Wmax". If the newly obtained target power output "W" exceeds the maximum power output "Wmax", the target power output "W" is reduced or corrected to the upper limit value "Wmax" (i.e. W=Wmax).

In the same step S103, generator output controller 61 makes another judgement as to whether the newly obtained target power output "W" calculated in step S102 is smaller than a predetermined minimum power output "Wmin". If the newly obtained target power output "W" is smaller than the minimum power output "Wmin", the target power output "W" is increased or corrected to the lower limit value "Wmin" (i.e. W=Wmin).

In determining maximum power output Wmax and minimum power output Wmin, the efficiency of the internal combustion engine and other factors should be taken into consideration.

Subsequently, in step S104, generator output controller 61 drives internal combustion engine 40 so that the target power output "W" can be obtained from generator 30. After finishing the output control of generator 30, generator output controller 61 makes a judgement in step S105 as to whether the vehicle has finished the cruising. If the vehicle is still running ("No" in the step S105), the control flow returns to step S100 and repeats the steps S100 through S105. If the vehicle is stopped ("YES" in the step S105), this routine is ended.

Figure 4A:
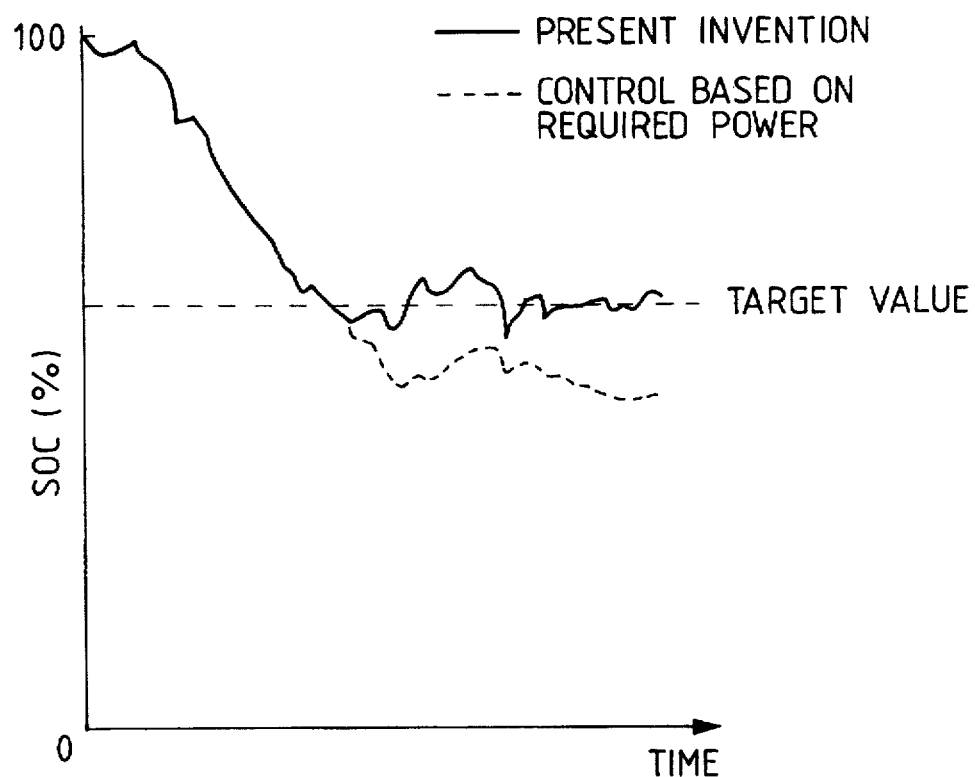
Figure 4B:
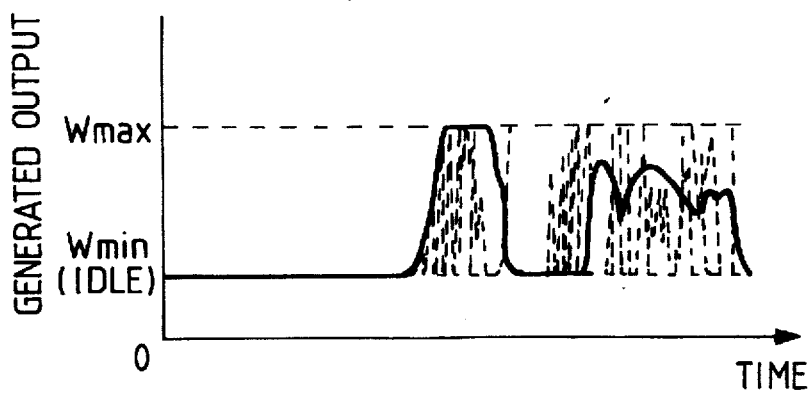
FIG. 4B is a graph showing the electric power outputted from the generator, wherein a solid line represents the result according to the first embodiment of the present invention while a dotted line represents the result according to a comparative control.
Figure 5:
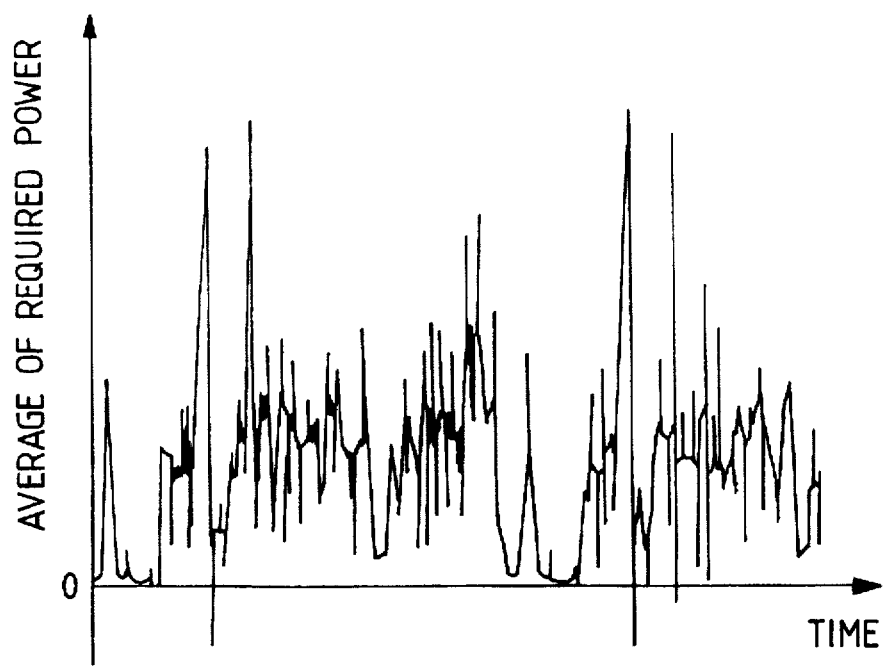
FIG. 5 is a graph showing the average power required when the hybrid vehicle is cruising.
Figure 6B:
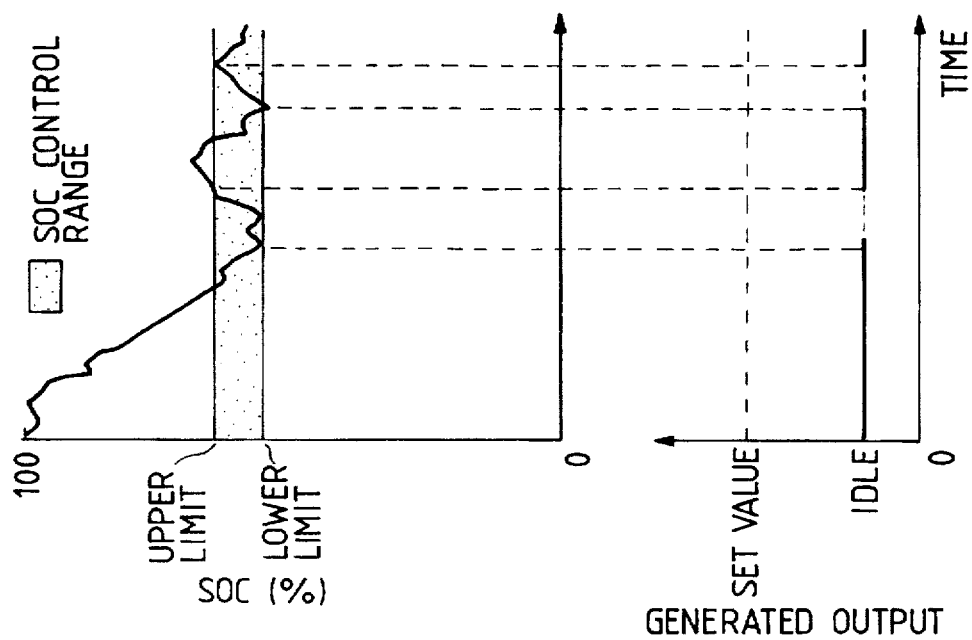
FIGS. 6A and 6B are graphs showing the change of a SOC and the generated output in accordance with a conventional generator control system for a hybrid vehicle.
Figure 6A:
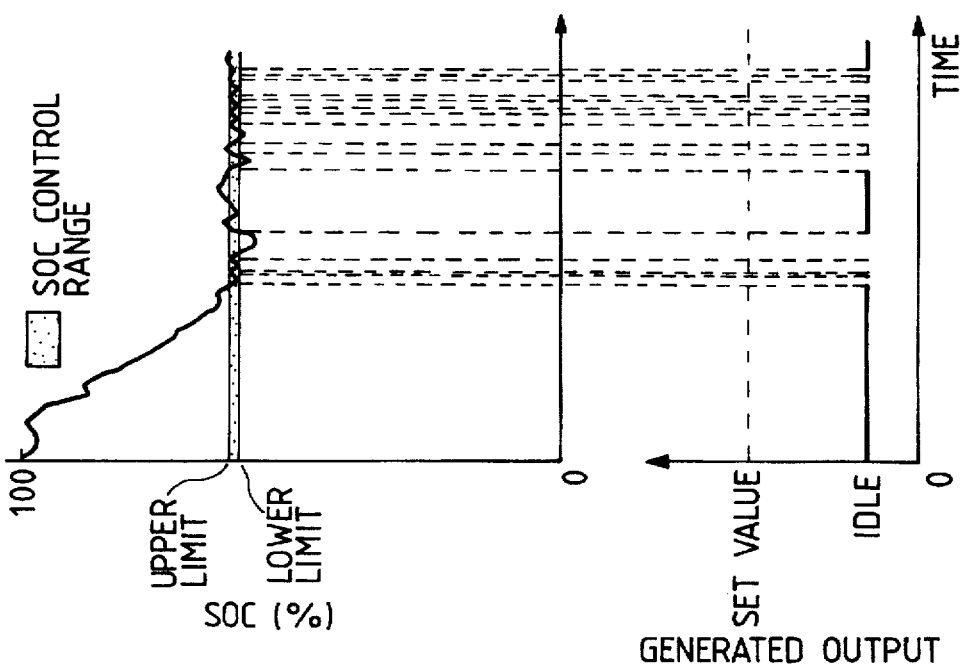

FIG. 4A shows the change of SOC during the cruising of the hybrid vehicle, while FIG. 4B shows the electric power outputted from the generator, wherein a solid line represents the result according to the generator output control of the present invention while a dotted line represents the result according to a comparative control based on the required power.

As understood from FIGS. 4A and 4B, according to the comparative control based on the required power, the generator is subjected to a large variation or other fluctuation of power output. In general, emission of exhaust gas tends to worsened when the engine speed is largely varied or fluctuated in this manner. Furthermore, as shown in FIG. 4A, SOC tends to be gradually decreased and offset from the target value.

On the other hand, according to the embodiment of the present invention, the variation or fluctuation of the power output of the generator can be suppressed within a small range and the SOC is almost equalized to the target value without causing undesirable deviation -or offset, because the generator output is controlled by taking account of both the magnitude of the SOC and the variation of the same. More specifically, in calculating the target power output "W", the command variation amount ΔW is always determined based on the SOC and ΔSOC.

Figure 7:
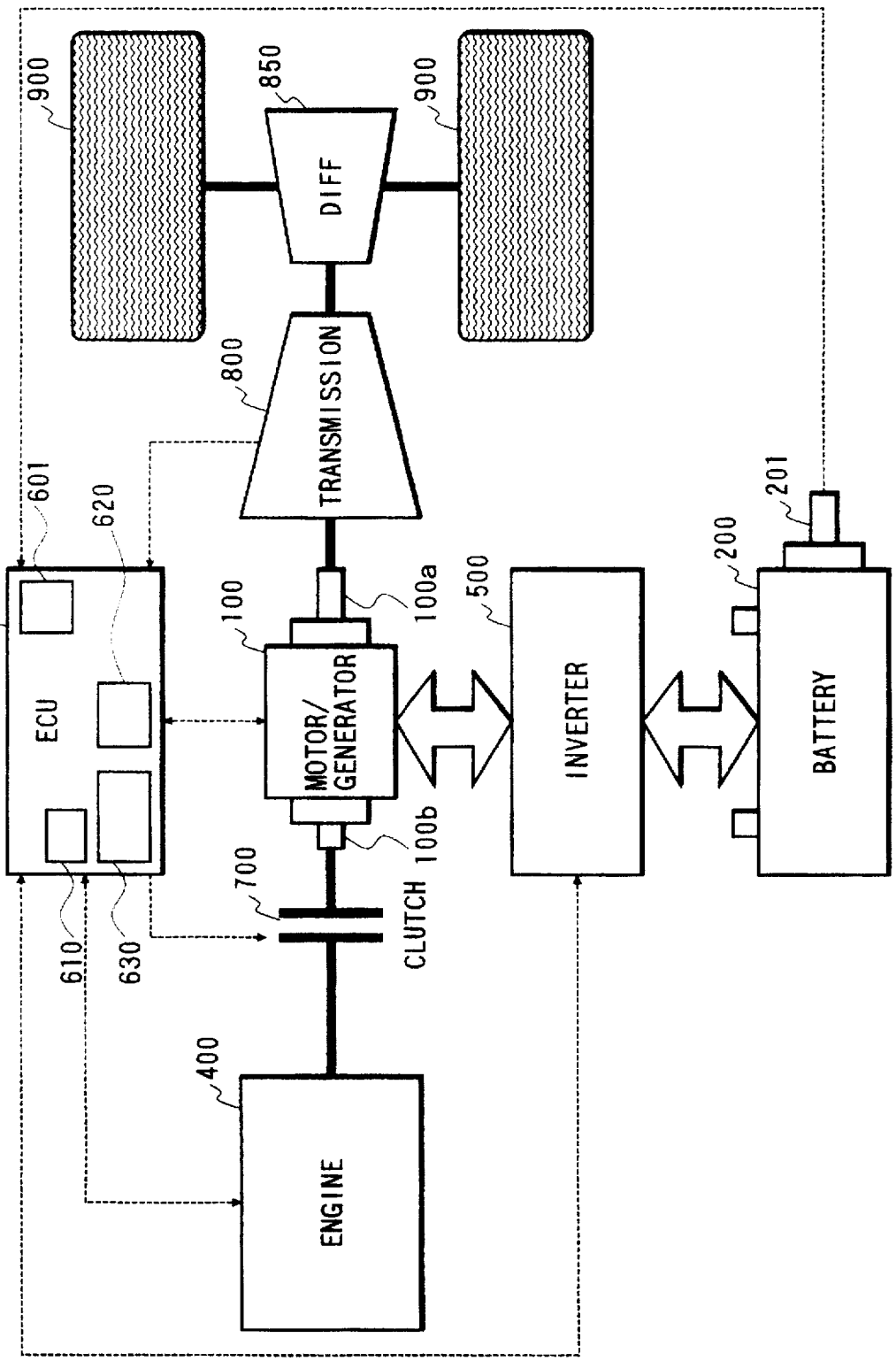
FIG. 7 is a block diagram showing an overall arrangement of a generator control system incorporated in a parallel hybrid vehicle in accordance with a second embodiment of the present invention.

Hereinafter, a second embodiment of the present invention will be explained with reference to FIGS. 7 through 9. FIG. 7 shows an overall arrangement of a generator control system incorporated in a parallel hybrid vehicle in accordance with a second embodiment of the present invention.

An internal combustion engine 400, serving as a main driving power source for the hybrid vehicle, is connected through a clutch 700 to an input shaft 100b of electric motor/generator 100 serving as a sub driving power source for the hybrid vehicle. The electric motor/generator has an output shaft 100a connected and linked in a driving relation to vehicle wheels 900 through a conventional driving mechanism including a transmission 800 and a differential mechanism 850. Namely, the speed of a rotational driving force of internal combustion engine 400 or motor/generator 100 is changed by transmission 800 and transmitted to vehicle wheels 900 via differential mechanism 850.

The motor/generator 100 has functions both as of an electric motor and a generator. More specifically, when the motor/generator 100 acts as an electric motor, it generates an output torque in accordance with an exciting current variably controlled by an exciting current control signal. On the other hand, when the motor/generator 100 acts as a generator, it generates a regenerative torque in a regenerative braking during deceleration of the hybrid vehicle.

The motor/generator 100 is electrically connected to a high-voltage battery 200 supplying approximately 100 volts through an inverter 500. The battery 200 is equipped with a battery capacity sensor 201 detecting an integrating current value which is a parameter representing the state of charge (SOC) of battery 200.

Inverter 500, interposed between motor/generator 100 and battery 200 so as to be electrically connectable with each of them, is controlled by ECU 600 so as to establish or release the electrical connection between motor/generator 100 and battery 200, and also to adjust an electric value in the power supply from one element to the other element.

ECU 600 is connected to plural sensors which cooperatively detect the vehicle operating conditions including the amounts an accelerator pedal and a brake pedal are depressed and a vehicle speed. ECU 600 controls an output of internal combustion engine 400 by generating a fuel injection control signal and an ignition timing control signal in accordance with the vehicle operating conditions detected by these sensors.

ECU 600 receives a signal representing the state of charge (SOC) of battery 200 from battery capacity sensor 201, and adjusts an engine output in accordance with the detection values of the SOC and the variation of the same.

ECU 600 always generates a function switching signal for selecting either the motor function or the generator function, and a duty signal representing a torque (i.e. a motor output torque or a generator regenerative torque) required for motor/generator 100. The function switch signal and duty signal are supplied to inverter 500 so that the state of charge of battery 200 is maintained at a constant state.

ECU 600 comprises a memory 601 storing later-described control programs and various data used for computations, and interface circuits sending out control signals to the components of the hybrid vehicle or receiving signals from the same or sensors.

In this second embodiment, ECU 600 comprises an engine output controller 610, a function switching controller 620 for selecting the function of motor/generator 100, and a clutch controller 630 for engaging or disengaging the input and output shafts of clutch 700.

Figure 8:
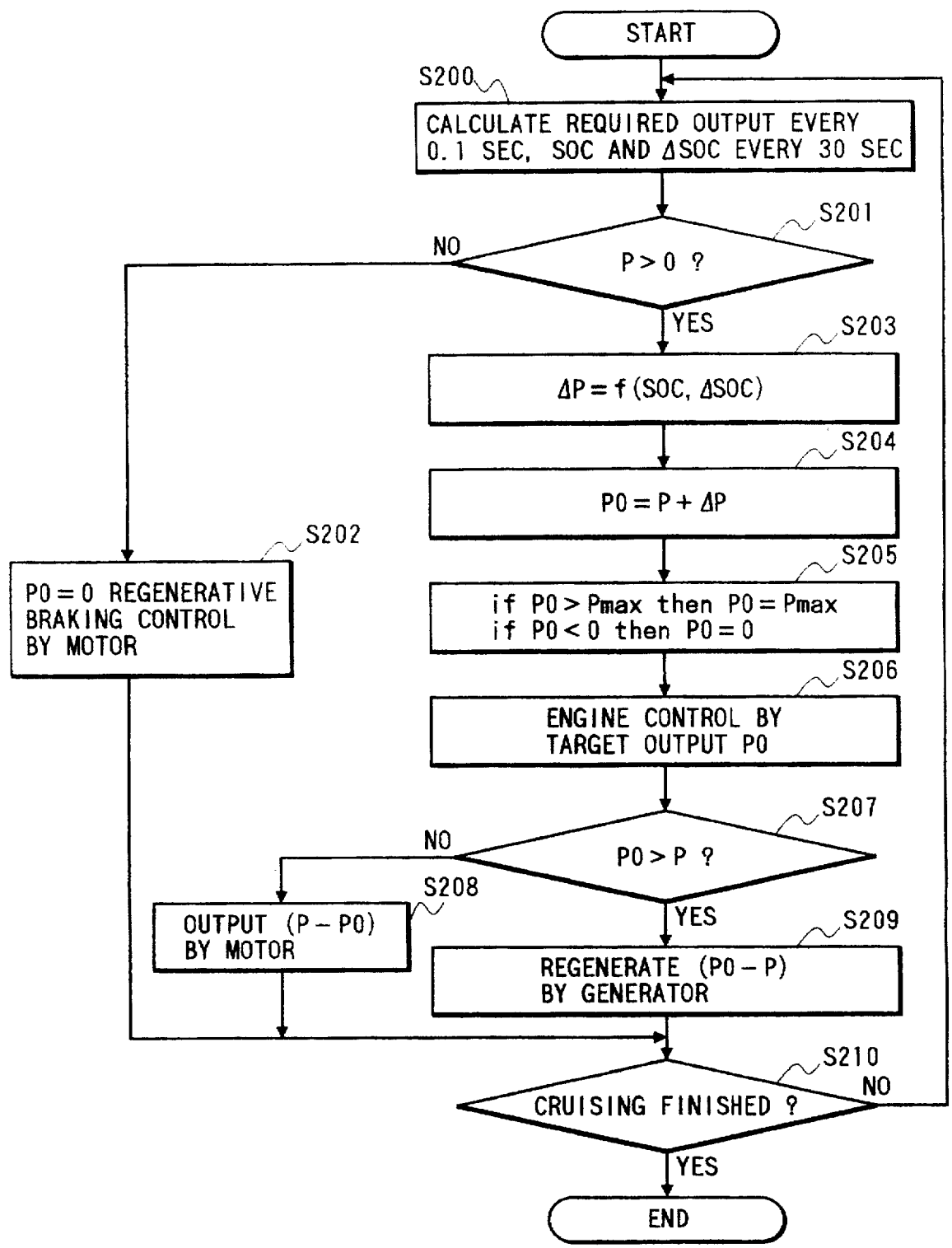
FIG. 8 is a flow chart illustrating the operation of an engine output controller of ECU shown in FIG. 7.

FIG. 8 shows a flow chart illustrating the operation of each of engine output controller 610, motor/generator function switching controller 620 and clutch controller 630.

In step S200, after the routine is started upon a start-up operation of the hybrid vehicle, engine output controller 610 calculates a required output "P" every 0.1 second. In this case, the required output "P" is determined based on various detection signals representing vehicle operating conditions such as the depressing amounts of the accelerator pedal and the brake pedal are depressed or the vehicle speed. In addition, in the same manner as the first embodiment, engine output controller 610 detects the state of charge (SOC) of battery 200 together with its variation ΔSOC every 30 seconds based on the signals sent from battery capacity sensor 201.

In step S201, a judgement is made as to whether the required output "P" is positive or negative. When the required output "P" is zero or negative (i.e. "NO" in the step S201), engine output controller 610 sets the target engine output "P0" to "0" (i.e. P0=0) in step S202. Then, motor/generator function switching controller 620 generates a signal for selecting the generator function. ECU 600 controls inverter 500 so as to optimally perform the regenerative braking operation.

Meanwhile, the clutch controller 630 generates a signal for disengaging the input and output shafts of clutch 700 and sends the signal to clutch 700. With the disengagement of clutch 700, internal combustion engine 400 is completely separated from motor/generator 100. Thus, it becomes possible to eliminate any motoring load loss caused by internal combustion engine 400, thereby resulting in a high efficient recovery of regenerative energy in the generation by the motor/generator 100.

In this second embodiment, the engagement of clutch 700 is carried out after the rotational speed of internal combustion engine 400 (i.e. the rotational speed of the input shaft of clutch. 700) is adjusted to be nearly equal to the rotational speed of motor/generator 100 (i.e. the rotational speed of the output shaft of clutch 700).

More specifically, the parallel hybrid vehicle usually starts up with a driving force of an associated electric motor and travels until it reaches an ordinary running condition. Then, after the vehicle running condition is stabilized, the input and output shafts of clutch 700 are engaged with each other to directly transmit the rotational output of internal combustion engine 400 to motor/generator 100, thereby driving the hybrid vehicle by the powerful driving force of internal combustion engine 400. However, according to the second embodiment of the present invention, the clutch 700 is selectively engaged or disengaged by clutch controller 630 so as to engage and disengage internal combustion engine 400 with and from motor/generator 100 in accordance with various running conditions of the hybrid vehicle.

It is desirable to engage the input and output shafts of clutch 700 to connect internal combustion engine 400 to motor/generator 100 when the hybrid vehicle is stopped and to cause motor/generator function switching controller 620 to select the motor function so that motor/generator 100 can be used as a starter in the start-up operation of internal combustion engine 400.

When the required output "P" is positive (i.e. "YES" in the step S201), the engine output controller 610 calculates the engine output correction amount ΔP using the state of charge (SOC) of battery 200 and the variation of SOC (i.e. ΔSOC) as parameters of the following function:

$$\Delta P = f(SOC, \Delta SOC) \quad (3).$$

The function defining ΔP will be explained in the same manner as the function ΔW of the first embodiment with reference to FIG. 3. Namely, the data map shown in FIG. 3 is not limited to the first embodiment, although it was used for obtaining the command variation amount ΔW in the calculation of the target power output "W".

More specifically, FIG. 3 is used for obtaining the engine output correction amount ΔP in the calculation of target engine output "P0" in this second embodiment. As shown in FIG. 3, engine output correction amount ΔP (in the parentheses) is expressed in the form of a three-dimensional data map in relation to SOC and ΔSOC. The data of this map are determined in accordance with the required performance of the vehicle in the design of the control system.

More specifically, in the same manner as in the first embodiment, the map shown in FIG. 3 illustrates the rule for the fuzzy control, according to which:

(1) the engine output correction amount "ΔP" is maintained when the SOC is high and ΔSOC is a negative value;

(2) the engine output correction amount "ΔP" is decreased when the SOC is high and ΔSOC is a positive value;

(3) the engine output correction amount "ΔP" is increased when the SOC is low and ΔSOC is a negative value; and (4) the engine output correction amount "ΔP" is maintained when the SOC is low and ΔSOC is a positive value.

In the second embodiment, the target value for SOC control is set to 60%, taking account of the experimental result that the charging efficiency of the battery was worsened when the SOC is 70% or more.

With reference to FIG. 3, it will be understood that engine output correction amount ΔP takes +1 (kw) when SOC is 70% and ΔSOC is −5%, and takes −4 (kw) for the same SOC when ΔSOC is changed to 0%, as indicated by the small circles in the drawing.

In this case, engine output correction amount ΔP can be given by the following equation:

$$\Delta P = -0.4 \times SOC - \Delta SOC + 24.0, \text{ when } -5.0 \leq \Delta P \leq 5.0; \Delta P = 5.0, \text{ when } \Delta P > 5.0; \text{ and } \Delta P = -5.0, \text{ when } \Delta P < -5.0 \quad (3').$$

Returning to the flow chart of FIG. 8, in step S204, engine output controller 610 calculates the target engine output "P0" based on the following formula:

$$P0 = P + \Delta P \quad (4).$$

In step S205, engine output controller 610 makes a judgement as to whether the obtained target engine output "P0" thus calculated in step S204, exceeds the maximum engine output "Pmax". If the obtained target engine output "P0" exceeds the maximum engine output "Pmax", the target engine output "P0" is reduced or corrected to the upper limit value "Pmax" (i.e. P0=Pmax).

In the same step S205, engine output controller 610 makes another judgement as to whether the obtained target engine output "P0" calculated in step S204 is smaller than "0". If the obtained target engine output "P0" is smaller than "0", the target engine output "P0" is increased or corrected to "0" (i.e. P0=0).

Figure 9:
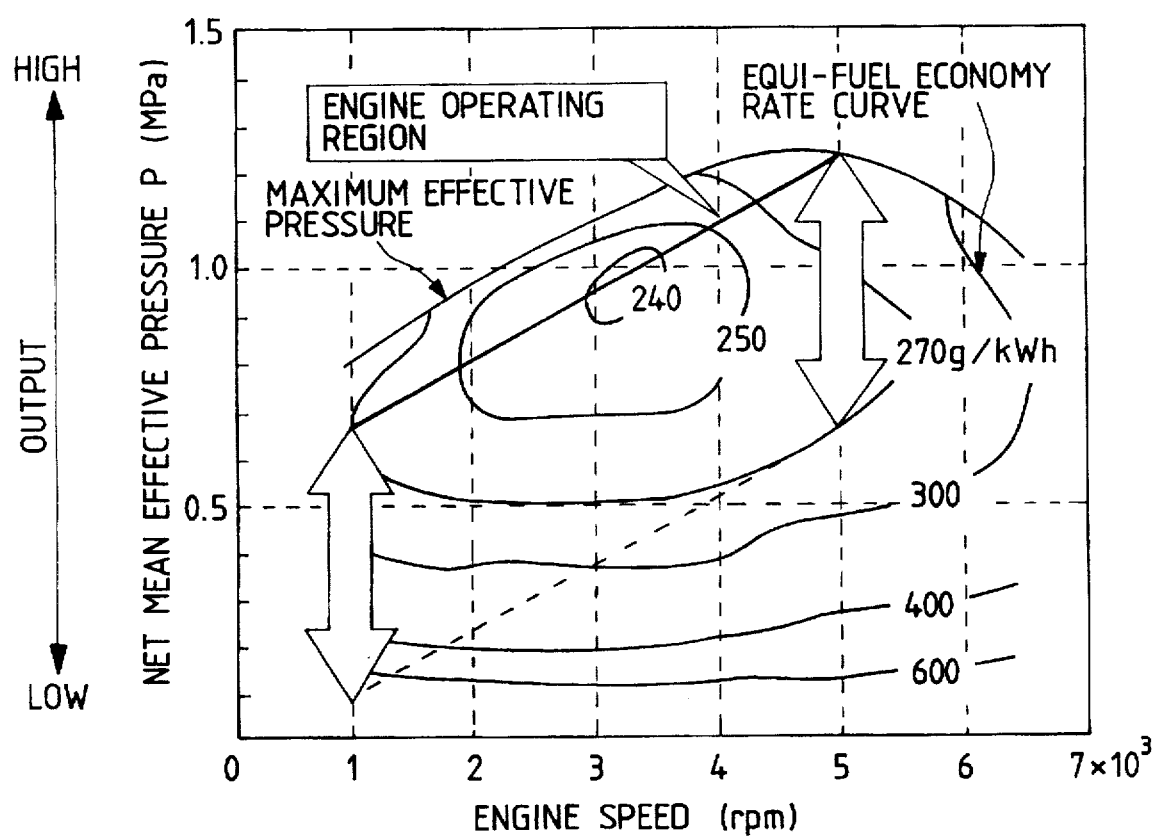
FIG. 9 is a graph illustrating an optimum engine operating region.

In determining maximum engine output Pmax, the optimum fuel economy region of the internal combustion engine shown in FIG. 9 is taken into consideration. As shown by equi-fuel economy rate curves in FIG. 9, the internal combustion engine 400 has the optimum fuel economy region of 240 g/kWh at the engine rotational speed of nearly $3 \times 10^3$ rpm with the net mean effective pressure of nearly 1.0 MPa. Thus, the actual engine operating region is depicted by a solid line connecting an upper limit and a lower limit. As shown in FIG. 9, the maximum effective pressure exists beyond the engine operating region, and the engine output at the same engine speed increases with increasing net mean effective pressure.

Subsequently, in step S206, engine output controller 610 generates the fuel injection control signal and the ignition timing control signal so that internal combustion engine 400 can produce the target engine output "P0".

Then, in step S207, a judgement is made as to whether target engine output "P0" is larger than the required engine output "P". If target engine output "P0" is equal to or smaller than the required engine output "P" (i.e. "NO" in the step S207), motor/generator function switching controller 620 generates a signal selecting the motor function and ECU 600 controls the motor/generator 100 to produce output (P−P0) which corresponds to a shortage to the presently required engine output "P".

On the other hand, if target engine output "P0" is larger than the required engine output "P" (i.e. "YES" in the step S207), motor/generator function switching controller 620 generates a signal selecting the generator function and ECU 600 controls the motor/generator 100 to regenerate or recover output (P0−P) which corresponds to a surplus to the presently required engine output "P".

After finishing the control of motor/generator 100, engine output controller 610 makes a judgement in step S210 as to whether the vehicle has finished the cruising. If the vehicle is still running ("NO" in the step S210), the control flow returns to step S200 and repeats the steps S200 through S210. If the vehicle is stopped ("YES" in the step S210), this routine is ended.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A generator control system for hybrid vehicles comprising:

a generator driven by an internal combustion engine;

a battery chargeable by said generator;

an electric motor driven by electric power supplied from said generator and said battery;

state-of-charge detecting means for detecting a state of charge of said battery at predetermined sampling intervals to obtain a present state-of-charge (SOC) of said battery and a variation ($\Delta$SOC) of said state-of-charge of said battery during a predetermined time interval based on said present state-of-charge (SOC); and control means for controlling an electrical output of said generator based on said present state-of-charge (SOC) and said variation ($\Delta$SOC).

2. The generator control system for hybrid vehicles defined by claim 1, wherein said control means performs a fuzzy control in such a manner so that said electrical output of said generator is maintained when a residual capacity of said battery is large and said battery is discharging, decreased when said residual capacity of said battery is large and said battery is charging, increased when said residual capacity of said battery is small and said battery is discharging, and maintained when said residual capacity of said battery is small and said battery is charging.

3. The generator control system for hybrid vehicles defined by claim 1, wherein said electric motor generates electric power to charge said battery by utilizing a regenerative braking in a deceleration of a hybrid vehicle.

4. The generator control system for hybrid vehicles defined by claim 1, wherein said control means comprises a memory for storing control commands used for a computation of a target power output of said generator.

5. The generator control system for hybrid vehicles defined by claim 4, wherein said memory stores said control commands in relation to said present state-of-charge (SOC) and said variation ($\Delta$SOC).

6. The generator control system for hybrid vehicles defined by claim 5, wherein said memory stores said control commands in the form of a three-dimensional data map.

7. The generator control system for hybrid vehicles defined by claim 1, wherein said control means uses an equation defined by said present state-of-charge (SOC) and said variation ($\Delta$SOC) to obtain a control command used for a computation of a target power output of said generator.

8. The generator control system for hybrid vehicles defined by claim 1, wherein a judgment is made as to whether a sign of said variation ($\Delta$SOC) is positive or negative, and said output of said generator is controlled in accordance with said sign of said variation ($\Delta$SOC).

9. The generator control system for hybrid vehicles defined by claim 1, wherein a judgment is made as to whether a level of said present state-of-charge (SOC) is high or low relative to a reference level and whether a sign of said variation ($\Delta$SOC) is positive or negative, and said output of said generator is controlled in accordance with said level of said present state-of-charge (SOC) and said sign of said variation ($\Delta$SOC).

10. A hybrid vehicle comprising:

an internal combustion engine;

a generator connected to and driven by said internal combustion engine;

an inverter electrically connected to said generator;

a battery chargeable by said generator through said inverter;

an electric motor driven by electric power supplied from said generator and said battery through said inverter, said electric motor acting as a driving source for driving vehicle wheels;

state-of-charge detecting means for detecting a state of charge of said battery at predetermined sampling intervals to obtain a present state-of-charge (SOC) of said battery and a variation ($\Delta$SOC) of the state-of-charge of said battery during a predetermined time interval based on said present state-of-charge (SOC); and control means for controlling an electrical output of said generator based on said present state-of-charge (SOC) and said variation ($\Delta$SOC).

11. The hybrid vehicle defined by claim 10, wherein said control means controls said internal combustion engine in such a manner so that said electrical output of said generator is maintained when a residual capacity of said battery is large and said battery is discharging, decreased when said residual capacity of said battery is large and said battery is charging, increased when said residual capacity of said battery is small and said battery is discharging, and maintained when said residual capacity of said battery is small and said battery is charging.

12. The hybrid vehicle defined by claim 10, wherein said internal combustion engine is exclusively used for rotating said generator.

13. The hybrid vehicle defined by claim 10, wherein said electric motor has an output shaft connected to said vehicle wheels through a driving mechanism including a transmission and a differential mechanism.

14. The hybrid vehicle defined by claim 10, wherein said electric motor generates electric power to charge said battery by utilizing a regenerative braking in a deceleration of said hybrid vehicle.

15. The hybrid vehicle defined by claim 10, wherein said internal combustion engine is driven at a wide open throttle condition, so that an output of said internal combustion engine is controlled by an amount of fuel supplied by a fuel supply device while maintaining a throttle at a wholly opened position.

16. The hybrid vehicle defined by claim 10, wherein said internal combustion engine is controlled within a limited output range so that an output of said internal combustion engine has a one-to-one relationship with a rotational speed of said internal combustion engine.

17. The hybrid vehicle defined by claim 10, wherein said inverter charges said battery by utilizing residual electric power when said generator generates excessive electric power.

18. The hybrid vehicle defined by claim 10, wherein said control means comprises a memory for storing control commands used for computing a target power output of said generator.

19. The hybrid vehicle defined by claim 18, wherein said memory stores said control commands in relation to said present state-of-charge (SOC) and said variation (ΔSOC).

20. The hybrid vehicle defined by claim 19, wherein said memory stores said control commands in the form of a three-dimensional data map.

21. The hybrid vehicle defined by claim 10, wherein said control means uses an equation defined by said present state-of-charge (SOC) and said variation (ΔSOC) to obtain a control command used for a computation of a target power output of said generator.

22. A control system for hybrid vehicles comprising:
an electric motor, having both motor and generator functions to form one driving source for driving wheels of a hybrid vehicle and serve as a generating source for generating electric power;
an internal combustion engine forming another driving source for driving said wheels of said hybrid vehicle;
a clutch interposed between said electric motor and said internal combustion engine for selectively engaging and disengaging said internal combustion engine with and from said electric motor;
a battery chargeable by said electric motor;
state-of-charge detecting means for detecting a state of charge of said battery at predetermined sampling intervals to obtain a present state-of-charge (SOC) of said battery and a variation (ΔSOC) of the state-of-charge of said battery during a predetermined time interval based on said present state-of-charge (SOC);
engine output control means for controlling an output of said internal combustion engine and a residual capacity of said battery based on said present state-of-charge (SOC) and said variation (ΔSOC);
motor function switching means for switching said electric motor between said motor function and said generator function on the basis of said control by said engine output control means; and
clutch controlling means for engaging and disengaging said internal combustion engine with and from said electric motor on the basis of said control by said engine output control means.

23. The control system for hybrid vehicles defined by claim 22, wherein said engine output control means performs a fuzzy control in such a manner so that an operating region of said internal combustion engine is maintained when said residual capacity of said battery is large and said battery is discharging, shifted to a lower output region when said residual capacity of said battery is large and said battery is charging, shifted to a larger output region when said residual capacity of said battery is small and said battery is discharging, and maintained when said residual capacity of said battery is small and said battery is charging.

24. The control system for hybrid vehicles defined by claim 22, wherein said engine output control means controls the output of said internal combustion engine so as to maintain said present state-of-charge (SOC) of said battery at a predetermined constant level.

25. The control system for hybrid vehicles defined by claim 22, wherein said electric motor generates electric power to charge said battery by utilizing a regenerative braking in a deceleration of said hybrid vehicle.

26. The control system for hybrid vehicles defined by claim 22, wherein said engine output control means is associated with a memory for storing control commands used for a computation of a target output of said internal combustion engine.

27. The control system for hybrid vehicles defined by claim 26, wherein said memory stores said control commands in relation to said present state-of-charge (SOC) and said variation (ΔSOC).

28. The control system for hybrid vehicles defined by claim 27, wherein said memory stores said control commands in the form of a three-dimensional data map.

29. The control system for hybrid vehicles defined by claim 22, wherein said control means uses an equation defined by said present state-of-charge (SOC) and said variation (ΔSOC) to obtain a control command used for a computation of a target output of said internal combustion engine.

30. A hybrid vehicle comprising:
an electric motor, having both motor and generator functions to form one driving source for driving vehicle wheels of said hybrid vehicle and serve as a generating source for generating electric power;
an internal combustion engine forming another driving source for driving said wheels of said hybrid vehicle;
a clutch interposed between said electric motor and said internal combustion engine for selectively engaging and disengaging said internal combustion engine with and from an input shaft of said electric motor;
an inverter electrically connected to said electric motor;
a battery chargeable by said electric motor through said inverter;
wherein said vehicle wheels are connected to an output shaft of said electric motor through a driving mechanism;
state-of-charge detecting means for detecting a state of charge of said battery at predetermined sampling intervals to obtain a present state-of-charge (SOC) of said battery and a variation (ΔSOC) of the state of charge of said battery during a predetermined time interval based on said present state-of-charge (SOC);
engine output control means for controlling an output of said internal combustion engine and a residual capacity of said battery based on said present state-of-charge (SOC) and said variation (ΔSOC);
motor function switching means for switching said electric motor between said motor function and said generator function on the basis of said control by said engine output control means; and
clutch controlling means for engaging and disengaging said internal combustion engine with and from said electric motor on the basis of said control by said engine output control means.

31. The hybrid vehicle defined by claim 30, wherein said engine output control means controls said internal combustion engine in such a manner so that an engine operating region is maintained when said residual capacity of said battery is large and said battery is discharging, shifted to a lower output region when said residual capacity of said battery is large and said battery is charging, shifted to a larger output region when said residual capacity of said battery is small and said battery is discharging, and maintained when said residual capacity of said battery is small and said battery is charging.

32. The hybrid vehicle defined by claim 30, wherein said engine output control means controls said internal combustion engine so as to maintain said present state-of-charge (SOC) of said battery at a predetermined constant level.

33. The hybrid vehicle defined by claim 30, wherein said electric motor generates electric power to charge said battery by utilizing a regenerative braking in a deceleration of said hybrid vehicle.

34. The hybrid vehicle defined by claim 30, wherein said inverter charges said battery by utilizing residual electric power when said electric motor generates excessive electric power.

35. The hybrid vehicle defined by claim 30, wherein said engine output control means is associated with a memory for storing control commands used for a computation of a target output of said internal combustion engine.

36. The hybrid vehicle defined by claim 35, wherein said memory stores said control commands in relation to said present state-of-charge (SOC) and said variation ($\Delta$SOC).

37. The hybrid vehicle defined by claim 36, wherein said memory stores said control commands in the form of a three-dimensional data map.

38. The hybrid vehicle defined by claim 30, wherein said engine output control means uses an equation defined by said present state-of-charge (SOC) and said variation ($\Delta$SOC) to obtain a control command used for a computation of a target output of said internal combustion engine.

39. A control method for a generator used in a hybrid vehicle, comprising steps of:

driving a generator by an internal combustion engine;

charging a battery by electric power produced by said generator;

driving an electric motor by electric power supplied from said generator and said battery, said electric motor having an output connected to vehicle wheels of said hybrid vehicle;

detecting a state of charge of said battery at predetermined sampling intervals to obtain a present state-of-charge (SOC) of said battery and a variation ($\Delta$SOC) of the state of charge of said battery during a predetermined time interval based on said present state-of-charge (SOC); and controlling an electrical output of said generator based on said present state-of-charge (SOC) and said variation ($\Delta$SOC).

40. The control method defined by claim 39, wherein said electrical output of said generator is maintained when a residual capacity of said battery is large and said battery is discharging, decreased when said residual capacity of said battery is large and said battery is charging, increased when said residual capacity of said battery is small and said battery is discharging, and maintained when said residual capacity of said battery is small and said battery is charging.

41. The control method defined by claim 39, wherein said electrical output of said generator is controlled in such a manner so that said present state-of-charge (SOC) is maintained at a predetermined constant level.

42. The control method defined by claim 41, wherein said predetermined level is approximately 60%.

43. A control method for a hybrid vehicle comprising steps of:

driving an internal combustion engine in accordance with vehicle driving conditions;

selectively engaging and disengaging said internal combustion engine through a clutch to and from an input shaft of an electric motor having both motor and generator functions;

charging a battery by electric power produced by said electric motor when said electric motor performs said generator function and discharging electric energy stored in said battery to said electric motor when said electric motor performs said motor functions;

driving vehicle wheels connected to an output shaft of said electric motor by an output of said electric motor;

detecting a state of charge of said battery at predetermined sampling intervals to obtain a present state-of-charge (SOC) of said battery and a variation ($\Delta$SOC) of the state of charge of said battery during a predetermined time interval based on said present state-of-charge (SOC); and controlling an output of said internal combustion engine, said electric motor and said clutch in such a manner so that a residual capacity of said battery is maintained at a predetermined level based on said present state-of-charge (SOC) and said variation ($\Delta$SOC).

44. The control method defined by claim 43, wherein an operating region of said internal combustion engine is maintained when said residual capacity of said battery is large and said battery is discharging, shifted to a lower output region when said residual capacity of said battery is large and said battery is charging, shifted to a larger output region when said residual capacity of said battery is small and said battery is discharging, and maintained when said residual capacity of said battery is small and said battery is charging.

45. The control method defined by claim 43, wherein said predetermined level is approximately 60%.

* * * * *